United States Patent
Cheng et al.

(10) Patent No.: US 8,160,238 B2
(45) Date of Patent: Apr. 17, 2012

(54) METHOD AND APPARATUS FOR DOUBLE-TALK DETECTION

(75) Inventors: Rong Cheng, Shenzhen (CN); Chongyan Zhang, Shenzhen (CN); Chunyan Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 242 days.

(21) Appl. No.: 12/577,410

(22) Filed: Oct. 12, 2009

(65) Prior Publication Data

US 2010/0183140 A1 Jul. 22, 2010

Related U.S. Application Data

(63) Continuation of application No. PCT/CN2009/070226, filed on Jan. 20, 2009.

(30) Foreign Application Priority Data

Jan. 20, 2009 (WO) .............. PCT/CN2009/070226

(51) Int. Cl.
*H04M 9/06* (2006.01)
(52) U.S. Cl. .................................. 379/406.03
(58) Field of Classification Search ......... 379/406.03
See application file for complete search history.

(56) References Cited

U.S. PATENT DOCUMENTS

| | | | |
|---|---|---|---|
| 5,732,134 A | 3/1998 | Sih | |
| 6,167,133 A | 12/2000 | Caceres et al. | |
| 6,947,552 B2 | 9/2005 | Takada | |
| 2002/0064139 A1* | 5/2002 | Bist et al. | 370/289 |
| 2003/0112261 A1* | 6/2003 | Zhang | 345/716 |
| 2008/0298601 A1 | 12/2008 | Rahbar | |

FOREIGN PATENT DOCUMENTS

| | | |
|---|---|---|
| CN | 1195932 A | 10/1998 |
| CN | 1494229 A | 5/2004 |

OTHER PUBLICATIONS

International Search Report and Written Opinion of corresponding PCT Patent Application No. PCT/CN2009/070226, mailed Oct. 29, 2009, 7 pages total.

* cited by examiner

*Primary Examiner* — Alexander Jamal

(57) ABSTRACT

The present invention discloses a double-talk detection method and apparatus. The method includes: obtaining a far-end signal frame and a near-end signal frame; and detecting a talk state according to a spectrum difference between the far-end signal frame and the near-end signal frame. The apparatus includes: an obtaining module, adapted to obtain a far-end signal frame and a near-end signal frame; and a spectrum detecting module, adapted to detect a talk state according to a spectrum difference between the far-end signal frame and the near-end signal frame. With the present invention, the talk state is detected according to the spectrum difference between the far-end signal and the near-end signal. Even if nonlinear distortion exists, the precision of detection is not impacted, whereas, the greater the distortion is, the more precise the detection result and the better the detection performance will be.

8 Claims, 6 Drawing Sheets

METHOD AND APPARATUS FOR DOUBLE-TALK DETECTION

This application is a continuation of International Application No. PCT/CN2009/070226, filed on Jan. 20, 2009, entitled "Method and Apparatus for Double-Talk Detection", the contents of which are all incorporated herein by reference in their entireties.

FIELD OF THE INVENTION

The present invent relates to voice communications, and in particular, to a method and apparatus for double-talk detection.

BACKGROUND OF THE INVENTION

In the field of voice communications, a voice communication product (for example, a handset) receives a far-end signal from a network, and after the signal is played via a speaker, an echo signal is generated in the acoustic path. The echo signal and the near-end voice signal are collected by a microphone and transferred to the other end. To cancel the echo signal, an acoustic echo cancellation technology is provided in a prior art, where an adaptive filter simulates an echo path to obtain an estimated echo signal and the estimated echo signal is removed from the near-end signal collected by the microphone so that the echo is cancelled.

In the acoustic echo cancellation technology, it is necessary to detect whether the near-end signal collected by the microphone includes a near-end voice signal. Such detection is double-talk detection. In particular, it is necessary to detect whether the current voice call is in a state of double-talk where the near end and the far end are both talking or in a state of single-talk where the local-end signal includes only the echo signal so as to decide whether to update the adaptive filtering coefficient.

With respect to double-talk detection, the prior art provides an energy based detection method, a signal correlation based detection method and a double filter based detection method.

The energy based detection method compares the transient power of the near-end signal and the transient power of the far-end signal so as to detect the current talk state. This method requires that the energy of the echo signal be lower than the energy of the near-end signal and the far-end signal, and therefore is applicable to scenarios where the energy of an echo signal is low only. This method relies on the energy level of the far-end signal and the echo signal, and the error rate is high.

The signal correlation based detection method calculates the correlation between the far-end signal and the near-end signal so as to detect the current talk state. The calculation is complex and the precision depends on the extent of signal distortion. When the echo signal is distorted, the precision of detection is lower.

The double filter based detection method calculates and compares two filtering results so as to detect the current talk state. Its precision also depends on the extent of signal distortion. When the echo signal is distorted, adaptive filtering is apt to emanate so that convergence is hard to achieve, and therefore the precision of detection is lower.

During the implementation of the present invention, the inventors find that the double-talk detection methods in the prior art are applicable to scenarios where the extent of nonlinear distortion is small and the energy of the echo signal is low. In a practical environment, taking a handset as an example, because a handset speaker is characteristic of bandpass, the speaker will introduce nonlinear distortion to the echo signal and this is unavoidable. Furthermore, in handsfree mode, the energy of the echo signal is high. As a result, in practical environments, the double-talk detection methods in the prior art offer a low precision of detection and a bad performance of detection. Once a near-end signal is mistaken as an echo signal, adaptive filtering is activated to cancel the near-end voice signal as an echo signal so that the quality of voice communications is severely impacted.

SUMMARY OF THE INVENTION

Embodiments of the present invention provide a double-talk detection method and apparatus for the purpose of improving the precision of detection.

A double-talk detection method includes:
obtaining a far-end signal frame and a near-end signal frame; and
detecting a talk state according to a spectrum difference between the far-end signal frame and the near-end signal frame.

A double-talk detection apparatus includes:
an obtaining module, adapted to obtain a far-end signal frame and a near-end signal frame; and
a spectrum detecting module, adapted to detect a talk state according to a spectrum difference between the far-end signal frame and the near-end signal frame.

With embodiments of the present invention, the talk state is detected according to the spectrum difference between the far-end signal and the near-end signal. Even if nonlinear distortion exists, the precision of detection is not impacted, whereas, the greater the distortion is, the more precise the detection result and the better the detection performance will be. Moreover, the energy level of the far-end signal and the echo signal will not impact the detection performance, so that embodiments of the present invention are particularly suitable for a hands-free scenario.

DETAILED DESCRIPTION OF THE EMBODIMENTS

Figure 1:
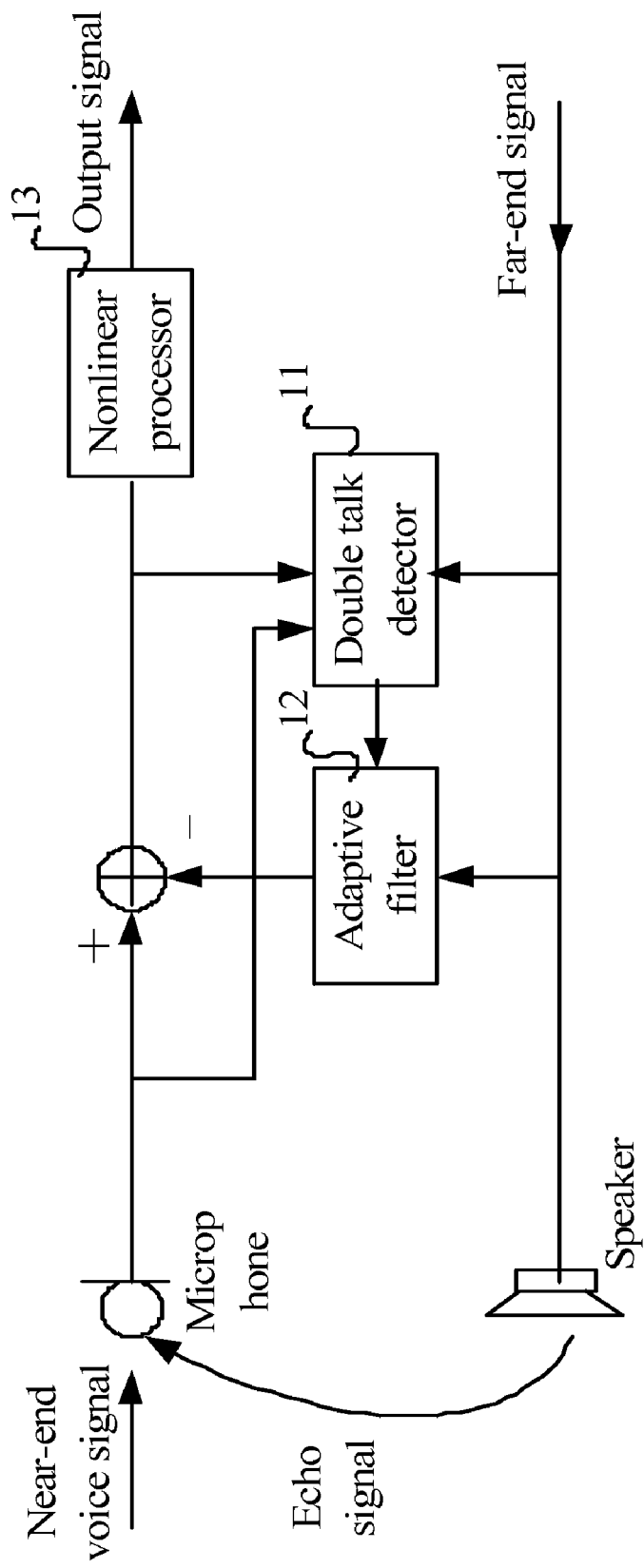
FIG. 1 is a schematic diagram showing a structure of an AEC applicable to embodiments of the present invention.

An Acoustic Echo Canceller (AEC) applicable to embodiments of the present invention will be first described. A structure of the AEC is shown in FIG. 1. The AEC includes a Double-Talk Detector (DTD) 11, an Adaptive Filter (AF) 12, and a Nonlinear Processor (NLP) 13. The DTD 11 is a key factor that restricts performance of the AEC. To address the problem that the prior double-talk detection technologies cannot detect double-talk state effectively in voice communication products, embodiments of the present invention provide a double-talk detection method and apparatus, which can be applied to the DTD 11. The technical solution of the present invention is hereinafter described in detail with reference to accompanying drawings and exemplary embodiments.

Figure 2:
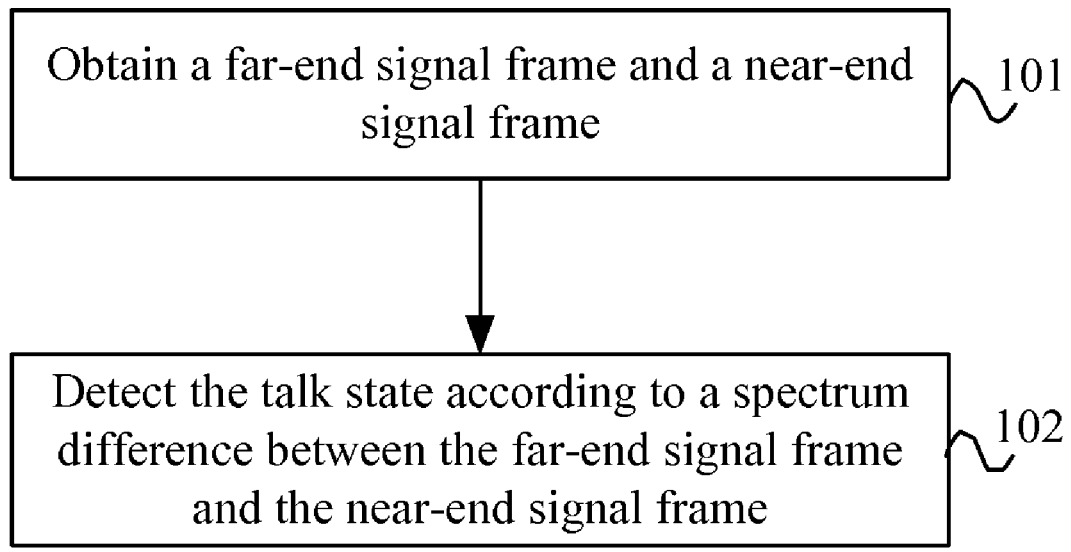
FIG. 2 shows a flowchart of a double-talk detection method according to an embodiment of the present invention.

FIG. 2 shows a flowchart of a double-talk detection method according to an embodiment of the present invention. The method includes the following blocks:

Block 101: Obtain a far-end signal frame and a near-end signal frame.

Block 102: Detect the talk state according to a spectrum difference between the far-end signal frame and the near-end signal frame.

Because a speaker is characteristic of bandpass, the low-frequency portion of the echo signal that passes through the speaker is attenuated. When hardware is fixed, the low-frequency attenuation of the echo signal induced by nonlinear distortion of the speaker is invariable and therefore, the spectrum difference between the echo signal and the far-end signal is invariable. If a near-end voice signal exists, the spectrum difference between the near-end signal and the far-end signal will change. In this embodiment, the talk state is detected according to the spectrum difference between the far-end signal frame and the near-end signal frame. Even if nonlinear distortion exists, the precision of detection is not impacted, whereas the greater the distortion is, the more precise the detection result and the better the detection performance will be. Moreover, the energy level of the far-end signal and the echo signal will not impact the detection performance so that the method in this embodiment is particularly suitable for a hands-free scenario.

Figure 3:
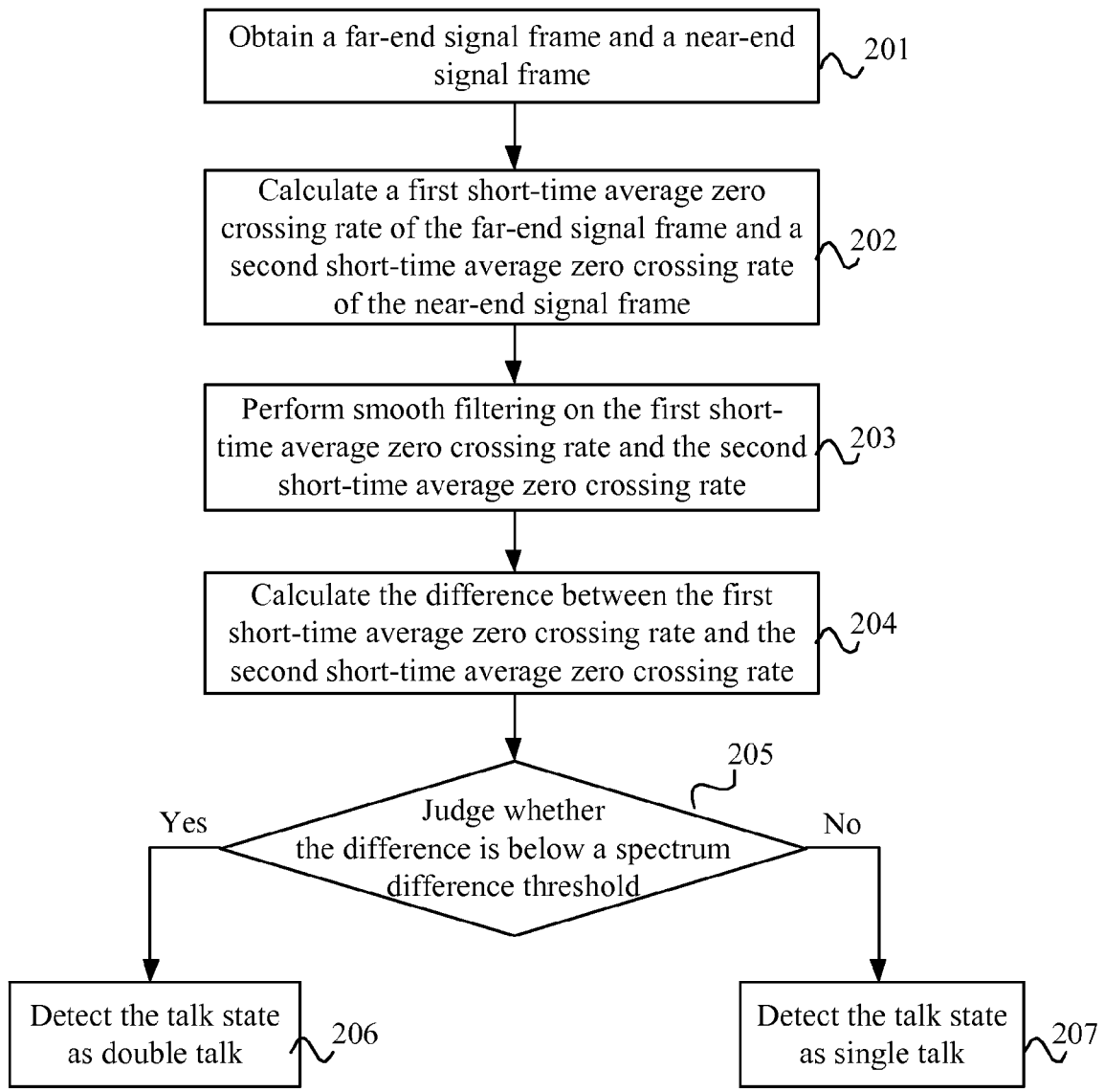
FIG. 3 shows a flowchart of a double-talk detection method according to another embodiment of the present invention.

FIG. 3 shows a flowchart of a double-talk detection method according to another embodiment of the present invention. The method includes the following blocks:

Block 201: A far-end signal frame and a near-end signal frame are obtained.

Specifically, the DTD 11 obtains the far-end signal input frame and the near-end signal input frame and writes the far-end signal input frame to a buffer and obtains the far-end signal frame after delaying the far-end signal input frame for a specified time in the buffer (Tail_length indicates the number of sampling points matching the specified time). The specified time is the actual delay of the echo signal relative to the far-end signal. This means that the echo signal in the near-end signal input frame in fact matches the far-end signal after Tail_length points of delay. Generally, the echo delay of a handset is 16 ms. In the case of a signal with a sampling rate of 8000, Tail_length is 128.

The DTD 11 regards the near-end signal input frame as the near-end signal frame and processes the near-end signal frame together with the far-end signal frame.

Block 202: A first short-time average zero crossing rate of the far-end signal frame and a second short-time average zero crossing rate of the near-end signal frame are calculated.

In the embodiment of the present invention, the short-time average zero crossing rate is adopted to extract the frequency characteristic of a signal. The short-time average zero crossing rate means the number of occurrences where the product of signal magnitudes is below zero between every two neighboring sampling points, or the number of zero crossings by the signal frame curve. The larger the short-time average zero crossing rate is, the higher the frequency of the signal frame will be.

Block 203: Smooth filtering is carried out on the first short-time average zero crossing rate and the second short-time average zero crossing rate.

zcr1 indicates the first short-time average zero crossing rate, and zcr2 indicates the second short-time average zero crossing rate. The values of zcr1 and zcr2 are calculated as follows:

$$zcr1 = zcr1 * \hat{1}.zcr1\_pre;$$

$$zcr2 = zcr2 * \hat{1}.zcr2\_pre;$$

where, $\alpha$ is a smooth coefficient whose value is between 0 and 1; zcr1_pre and zcr2_pre are respectively the short-time average zero crossing rate of the previous far-end signal frame and that of the previous near-end signal frame.

The smooth filtering can reduce the high-frequency fluctuation of the short-time average zero crossing rate. The smaller the value of $\alpha$ is, the smoother the curve will be. Or, the smaller the difference between the short-time average zero crossing rate of the previous frame and that of the next frame is, the smoother the short-time average zero crossing rate curve will be. The larger the value of $\alpha$ is, the less smooth the curve will be.

Block 204: The difference between the first short-time average zero crossing rate and the second short-time average zero crossing rate is calculated.

The zcr1 and zcr2 in this block may be those obtained in block 202 or those after processing in block 203.

Block 205: It is checked whether the difference is below a spectrum difference threshold; if so, the process proceeds to block 206 or else the process proceeds to block 207.

The spectrum difference threshold is indicated by T. The value of T depends on the actual extent of nonlinear distortion of the speaker in the system and may be obtained by tests. In this embodiment, T is 6.

Block 206: It is detected that the talk state is double-talk.

Because zcr2−zcr1<T, it can be judged that the current talk state is double-talk. Then the detection result is input to a double-talk processing module of the AEC, specifically, to the AF 12. According to the detection result, the AF 12 does not update the adaptive filtering coefficient. The AF 12 sends the filtering result to the NLP 13 for processing.

Block 207: It is detected that the talk state is single talk.

Because zcr2−zcr1≧T, it can be judged that the current talk state is single talk. Then the detection result is input to a single talk processing module of the AEC, specifically, to the AF 12. According to the detection result, the AF 12 updates the adaptive filtering coefficient. The AF 12 sends the filtering result to the NLP 13 for processing.

The embodiment of the present invention considers the characteristic of voice communication products and detects the talk state by using the spectrum difference between the near-end signal and the far-end signal induced by nonlinear distortion of the speaker. Specifically, the frequency characteristic of a signal is extracted according to the short-time average zero crossing rate so that the talk state is detected according to a difference between the short-time average zero crossing rates of the far-end signal frame and the near-end signal frame. In this way, the precision of detection is not impacted by distortion, whereas the greater the distortion is, the more precise the detection result and the better the detection performance will be. Compared with the prior art, the method according to the embodiment of the present invention does not depend on the extent of nonlinear distortion or the energy level of the far-end signal and the echo signal, so that the quality of voice communications is better. Furthermore, in a hands-free scenario, the benefit of the embodiment of the present invention is more obvious.

A specific example will be given to further explain the technical solution of the embodiment of the present invention.

Figure 4:
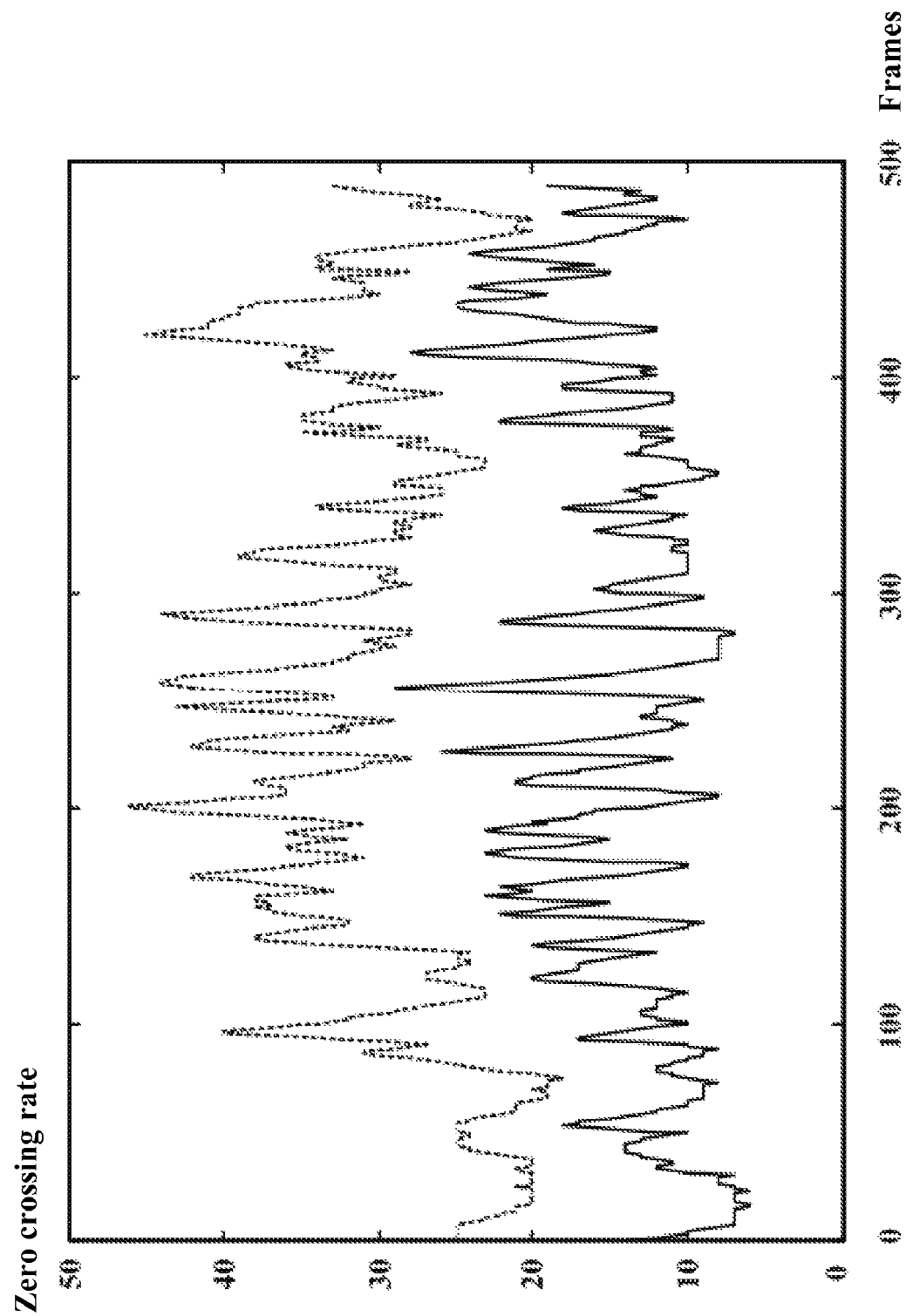
FIG. 4 is a schematic diagram showing a single-talk state curve in the double-talk detection method according to another embodiment of the present invention.
Figure 5:
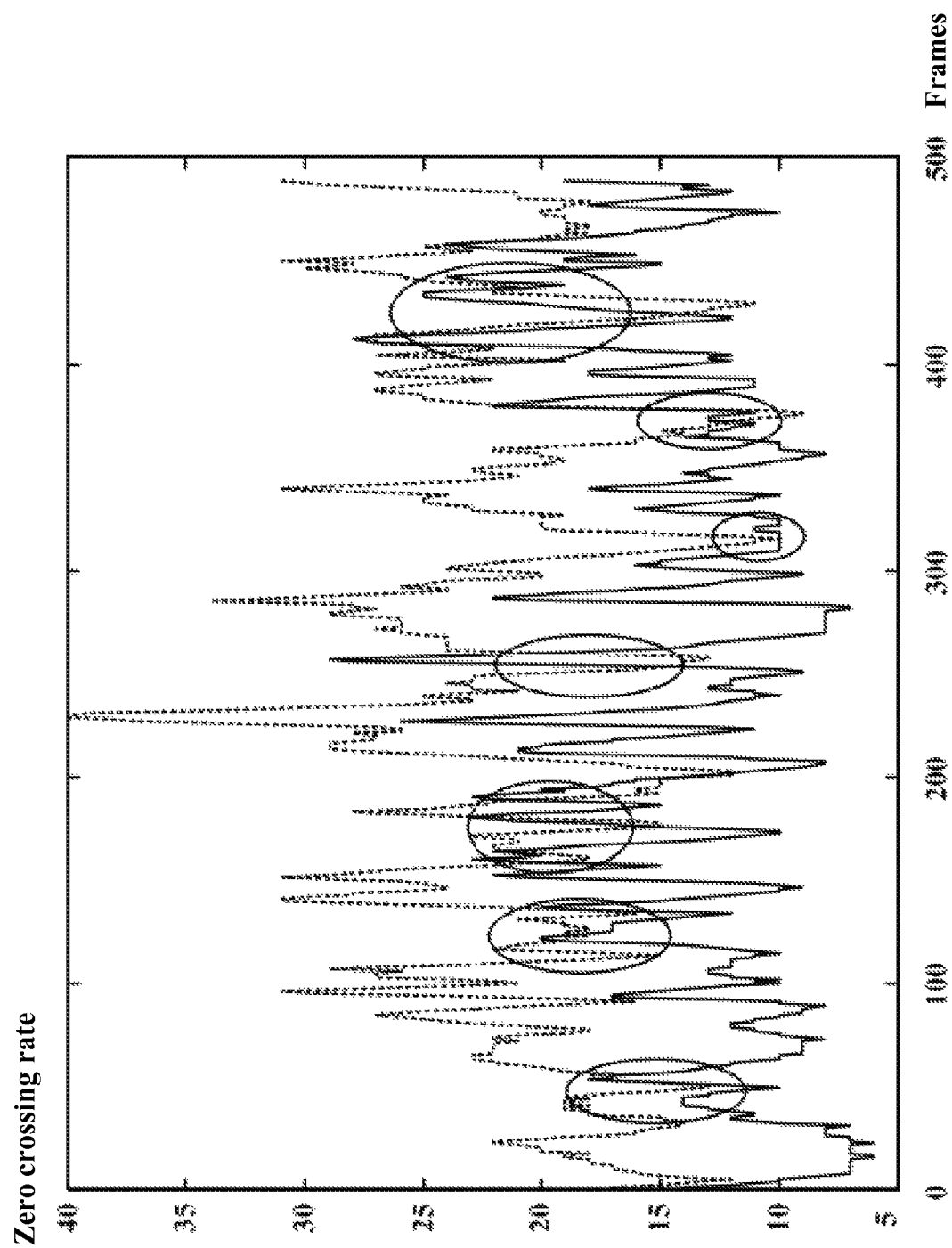
FIG. 5 is a schematic diagram showing a curve where a near-end voice exists in the double-talk detection method according to another embodiment of the present invention.

FIG. 4 shows a single talk state curve in the double-talk detection method according to another embodiment of the present invention and FIG. 5 shows a curve where a near-end voice signal exists in the double-talk detection method according to another embodiment of the present invention. The continuous line represents the short-time average zero crossing rate of the far-end signal frame and the dashed line represents the short-time average zero crossing rate of the near-end signal frame. The near-end signal in FIG. 4 includes an echo signal and that in FIG. 5 includes both the echo signal and the near-end voice signal.

As shown in FIG. 4, due to the low frequency signal attenuation induced by the nonlinear distortion of the echo signal, the echo signal as a whole is concentrated on the middle and high frequencies and the zero crossing rates of all distorted echo signals are higher than the zero crossing rate of the far-end signal. If the echo signal is not distorted, the zero crossing rate of the echo signal is equal to that of the far-end signal. In this case, the two curves in FIG. 4 will become one.

As shown in FIG. 5, because no nonlinear distortion is induced by the speaker to the near-end voice signal, when a near-end voice signal exists, the zero crossing rate of the near-end signal is approximate to the zero crossing rate of the far-end signal. For example, in the area enclosed by the ellipse in FIG. 5, a double-talk state is reflected. When no near-end voice signal exists, the zero crossing rate of the near-end signal departs from the zero crossing rate of the far-end signal and the talk state is single talk. By capturing changes in the zero crossing rate in real time, the method in the embodiment of the present invention detects whether a near-end voice signals exists and further judges the talk state.

The embodiment of the present invention is also applicable to the AEC of voice communication products which are characteristic of nonlinear distortion like a handset speaker.

Figure 6:
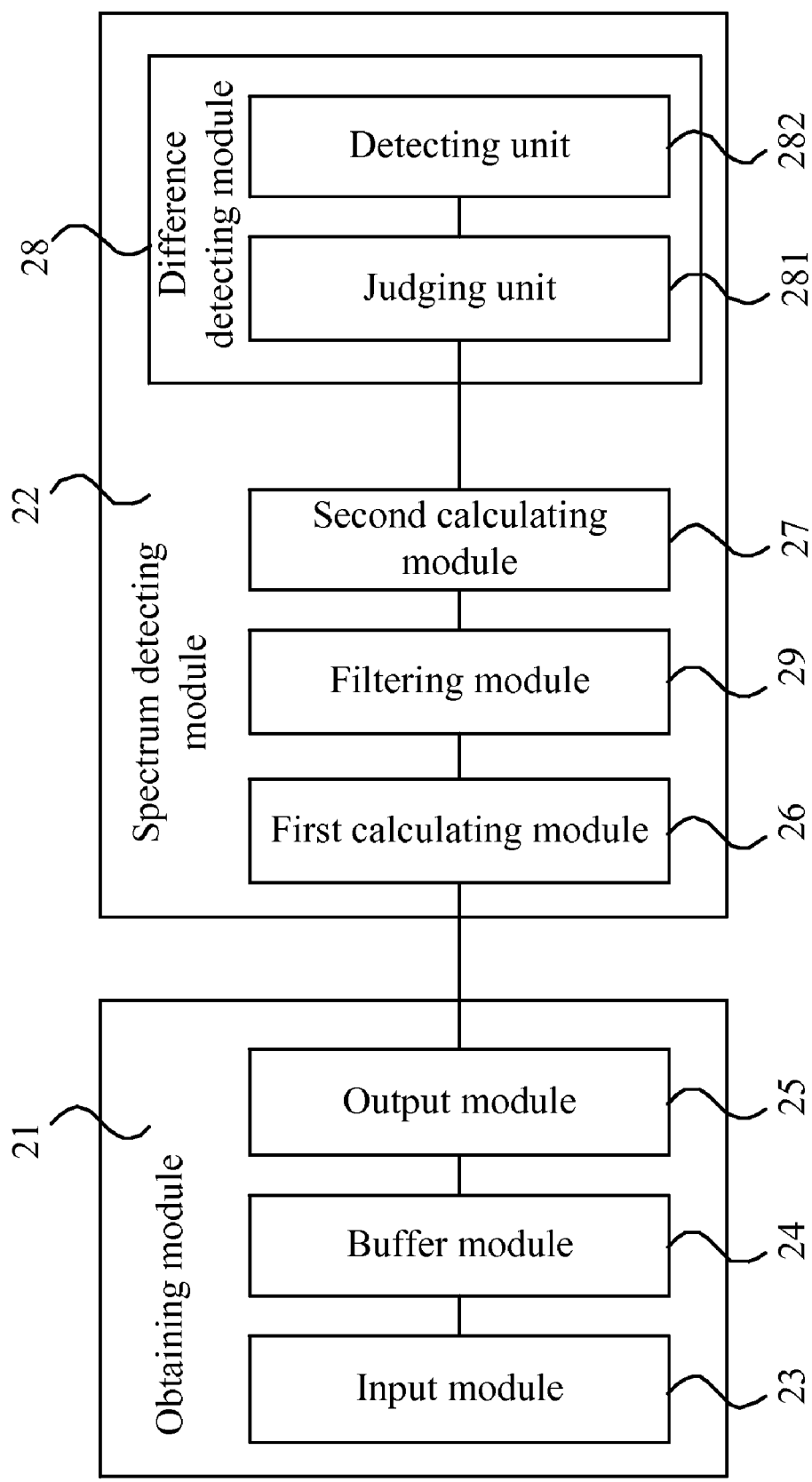
FIG. 6 is a schematic diagram showing a structure of a double-talk detection apparatus according to an embodiment of the present invention.

FIG. 6 shows a double-talk detection apparatus according to an embodiment of the present invention, and specifically, the DTD 11 in the AEC. The DTD 11 includes an obtaining module 21 and a spectrum detecting module 22, where the obtaining module 21 is adapted to obtain a far-end signal frame and a near-end signal frame, and the spectrum detecting module 22 is adapted to detect the talk state according to the spectrum difference between the far-end signal frame and the near-end signal frame.

Further, the obtaining module 21 includes an input module 23, a buffer module 24 and an output module 25, where the input module 23 is adapted to obtain the far-end signal input frame and the near-end signal input frame, and send the far-end signal input frame to the buffer module 24; the buffer module 24 is adapted to delay the far-end signal input frame for a specified time to obtain the far-end signal frame; and the output module 25 is adapted to regard the near-end signal input frame as the near-end signal frame, so as to output the far-end signal frame and the near-end signal frame.

The spectrum detecting module 22 includes a first calculating module 26, a second calculating module 27, and a difference detecting module 28, where the first calculating module 26 is adapted to calculate a first short-time average zero crossing rate of the far-end signal frame and a second short-time average zero crossing rate of the near-end signal frame; the second calculating module 27 is adapted to calculate the difference between the first short-time average zero crossing rate and the second short-time average zero crossing rate; and the difference detecting module 28 is adapted to detect the talk state according to the difference.

The spectrum detecting module 22 may further include a filtering module 29, adapted to perform smooth filtering on the first short-time average zero crossing rate and the second short-time average zero crossing rate obtained by the first calculating module 26, and output the result to the second calculating module 27.

Further, the difference detecting module 28 may include a judging unit 281 and a detecting unit 282, where the judging unit 281 is adapted to judge whether the difference is less than the spectrum difference threshold, and the detecting unit 282 is adapted to detect the talk state as double-talk when the judging unit 281 judges that the difference is less than the spectrum difference threshold, and detect the talk state as single talk when the judging unit 281 judges that the difference is bigger than or equal to the spectrum difference threshold.

The embodiment of the present invention considers the characteristic of voice communication products and detects the talk state by using the spectrum difference between the near-end signal and the far-end signal induced by nonlinear distortion of the speaker. Specifically, the frequency characteristic of a signal is extracted according to the short-time average zero crossing rate so that the talk state is detected according to a difference between the short-time average zero crossing rates of the far-end signal frame and the near-end signal frame. In this way, the precision of detection is not impacted by distortion, whereas the greater the distortion is, the more precise the detection result and the better the detection performance will be. Compared with the prior art, the method according to the embodiment of the present invention does not depend on the extent of nonlinear distortion or the energy level of the far-end signal and the echo signal, so that the quality of voice communications is better. Furthermore, in a hands-free scenario, the benefit of the embodiment of the present invention is more obvious.

It is understandable to those skilled in the art that all or part of the steps of the foregoing embodiments may be implemented by hardware instructed by a program. The program may be stored in a computer-readable storage medium. When being executed, the program performs the steps of the foregoing method embodiments. The storage medium may be any medium capable of storing program codes, for example, a Read-Only Memory (ROM), a Random Access Memory (RAM), a magnetic disk, and a compact disk.

Although the technical scheme of the present invention has been described through exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A double-talk detection method, comprising:
   obtaining a far-end signal frame and a near-end signal frame; and
   detecting a talk state according to a spectrum difference between the far-end signal frame and the near-end signal frame;
   wherein the detecting the talk state according to the spectrum difference between the far-end signal frame and the near-end signal frame comprises: calculating a first short-time average zero crossing rate of the far-end signal frame and a second short-time average zero crossing rate of the near-end signal frame; calculating a difference between the first short-time average zero crossing rate and the second short-time average zero crossing rate; and detecting the talk state according to the difference.

2. The method of claim 1, wherein the step of obtaining the far-end signal frame and the near-end signal frame comprises:
   obtaining a far-end signal input frame and a near-end signal input frame;
   delaying the far-end signal input frame for a specified time to obtain the far-end signal frame; and
   taking the near-end signal input frame as the near-end signal frame.

3. The method of claim 1, wherein, before the calculating the difference, the method further comprises:
   performing smooth filtering on the first short-time average zero crossing rate and the second short-time average zero crossing rate.

4. The method of claim 1, wherein the detecting the talk state according to the difference comprises:
   judging whether the difference is below a spectrum difference threshold, and if so, detecting the talk state as double-talk or else detecting the talk state as single talk.

5. A double-talk detection apparatus, comprising:
   an obtaining module adapted to obtain a far-end signal frame and a near-end signal frame; and
   a spectrum detecting module adapted to detect a talk state according to a spectrum difference between the far-end signal frame and the near-end signal frame;
   wherein the spectrum detecting module comprises:
   a first calculating module adapted to calculate a first short-time average zero crossing rate of the far-end signal frame and a second short-time average zero crossing rate of the near-end signal frame;
   a second calculating module adapted to calculate a difference between the first short-time average zero crossing rate and the second short-time average zero crossing rate; and
   a difference detecting module adapted to detect the talk state according to the difference.

6. The apparatus of claim 5, wherein the obtaining module comprises:
   an input module, adapted to obtain a far-end signal input frame and a near-end signal input frame;
   a buffer module, adapted to delay the far-end signal input frame for a specified time to obtain the far-end signal frame; and
   an output module, adapted to take the near-end signal input frame as the near-end signal frame.

7. The apparatus of claim 5, wherein the spectrum detecting module further comprises:
   a filtering module, adapted to perform smooth filtering on the first short-time average zero crossing rate and the second short-time average zero crossing rate.

8. The apparatus of claim 5, wherein the difference detecting module comprises:
   a judging unit, adapted to judge whether the difference is below a spectrum difference threshold; and
   a detecting unit, adapted to detect the talk state as double-talk when the judging unit judges that the difference is below the spectrum difference threshold, and detect the talk state as single talk when the judging unit judges that the difference is above or equal to the spectrum difference threshold.

* * * * *